United States Patent
Bornes

(10) Patent No.: US 7,433,500 B2
(45) Date of Patent: Oct. 7, 2008

(54) METHOD FOR RECOGNIZING DIGITAL FINGERPRINTS BY DISTORTION AND COMPUTER SYSTEM FOR USING SAID METHOD

(75) Inventor: Luc Bornes, Cergy (FR)

(73) Assignee: Sagem SA, Paris (FR)

( * ) Notice: Subject to any disclaimer, the term of this patent is extended or adjusted under 35 U.S.C. 154(b) by 760 days.

(21) Appl. No.: 10/480,016

(22) PCT Filed: Jun. 17, 2002

(86) PCT No.: PCT/FR02/02080

§ 371 (c)(1), (2), (4) Date: Dec. 5, 2003

(87) PCT Pub. No.: WO02/102248

PCT Pub. Date: Dec. 27, 2002

(65) Prior Publication Data

US 2004/0175022 A1    Sep. 9, 2004

(30) Foreign Application Priority Data

Jun. 15, 2001    (FR) .................................. 01 07860

(51) Int. Cl.
  *G06K 9/00*    (2006.01)
  *G06K 9/40*    (2006.01)
  *B42D 15/00*    (2006.01)
(52) U.S. Cl. ..................... 382/124; 382/275; 283/67
(58) Field of Classification Search .................. 382/124, 382/126, 115, 125, 275
See application file for complete search history.

(56) References Cited

U.S. PATENT DOCUMENTS

| 3,982,836 | A |   | 9/1976  | Green et al. |
| 4,641,350 | A | * | 2/1987  | Bunn ........................ 382/124 |
| 4,752,966 | A | * | 6/1988  | Schiller .................... 382/125 |
| 5,519,785 | A | * | 5/1996  | Hara ......................... 382/124 |
| 5,703,958 | A | * | 12/1997 | Hara ......................... 382/124 |
| 5,987,156 | A | * | 11/1999 | Ackland et al. ............ 382/125 |

(Continued)

OTHER PUBLICATIONS

Senior et al ; Improved Fingerprint Matching by Distortion Removal; IEICE Trans. Inf. & Syst., vol. E84-D, No. 7 Jul. 2001; Special Issue on Biometrics; http://www.research.ibm.com/people/a/aws/documents/papers/Senior-DistortionRemoval.pdf.*

(Continued)

*Primary Examiner*—Andrew W. Johns
*Assistant Examiner*—Andrae S Allison
(74) *Attorney, Agent, or Firm*—Patzik, Frank & Samotny Ltd.

(57) ABSTRACT

A digital fingerprint recognition method providing the steps of activating an image distortion software program on a computer, displaying a digital fingerprint image on a screen of the computer in a presentation environment for the image distortion software, and distorting the digital fingerprint image so as to correct a fault in the fingerprint detected on the digital fingerprint image. The computer system having a man/machine interface, a processing unit that is used to analyze a digital fingerprint image, coupler for accessing one or more files containing at least one digital fingerprint image and an image distortion software program that is used to display a digital fingerprint image on the man/machine interface and to distort the digital fingerprint image by the man/machine interface.

9 Claims, 4 Drawing Sheets

U.S. PATENT DOCUMENTS 6,241,288 B1 * 6/2001 Bergenek et al. .............. 283/67
6,324,297 B1 * 11/2001 Uchida ...................... 382/125

OTHER PUBLICATIONS

Cappelli et al; Modelling Plastic Distortion in Fingerprint Images; S. Singh, N. Murshed, and W. Kropatsch (Eds.): ICAPR 2001, LNCS 2013, pp. 369-376, 2001. Ó Springer-Verlag Berlin Heidelberg 2001.*

Adobe; Abode PhotoShop 5.0 User Guide; MacMillan Computer Publishing USA; Pap/Cdr edition (Jun. 9, 1998); pp. 185-186.*

"Adobe Photoshop 5.0 User guide" 1998, Scotland XP002193088. p. 185, left column, alinéa 3, p. 186 right column, line 3.

* cited by examiner

METHOD FOR RECOGNIZING DIGITAL FINGERPRINTS BY DISTORTION AND COMPUTER SYSTEM FOR USING SAID METHOD

FIELD OF THE INVENTION

The field of the invention is that of the recognition of fingerprints.

BACKGROUND OF THE INVENTION

The recognition of fingerprints is commonly used to identity a person through his fingerprints.

A database of fingerprints generally catalogs a multitude of fingerprint images with a set of characteristic points for each one and a match with an identity of someone to whom the fingerprint is attributed.

A fingerprint image consists of a certain number of relatively dark lines separated by relatively light lines with stopping points and points of modification of curvature that constitute the characteristic points of the fingerprint.

To establish a one-to-one match between an image that results from the taking of a print of unknown identity and an image of a print from the database, one proceeds overall in the following manner. The unknown print image is presented to a specialist who determines characteristic points of the unknown print. The unknown print image together with its determined characteristic points, is submitted to a computer system which compares it with the images of the database. The computer system picks out from the images of the database, a sample of those that an algorithm judges in a known manner, to be the closest to the image submitted. The images picked out by the computer system are thereafter presented to the specialist who compares them with the unknown print image so as to find a match between the unknown print image and a print image from the database.

A problem arises when the unknown identity of the print results from having taken it from some arbitrary surface, in particular a non-planar surface. This is the case, for example, in a police inquiry during which fingerprints are taken from any type of object. The results are not always as accurate as for fingerprints that result from the even pressure of a finger on a planar surface specifically provided for this purpose. In particular, certain lines may be distorted, on account for example, of local deformation of the skin due to its elasticity or of a distortion of the supporting object while the print is being deposited.

To determine the characteristic points before submission to the computer system, the specialist is confronted with an effort of imagination that is continuously sustained during the observation of the image to interpret whether, for example, a break in line curvature gives rise to a characteristic point determination or whether it seems rather to result from a fault with the taking of the print by comparison with the whole image.

When several fingerprint images, picked out by the computer system as having characteristic points of the fingerprint of unknown identity, are presented to the specialist so that he may choose the one he judges to be closest to the image under study, the specialist is again confronted with an effort of imagination in order to compare each image presented with the image submitted. On account of absence of similarity that results from faults with the taking of prints, the specialist must raise the matter of ascertaining for each image presented whether an absence of similarity results from the fact that the fingerprint is different or from the fact that the print taken is spoilt. This additional intellectual effort impedes efficiency and induces fatigue in the specialist.

SUMMARY OF THE INVENTION

To alleviate the aforementioned drawbacks, a first subject of the invention is a method of fingerprint recognition comprising steps consisting in:

activating an image distortion software program on a computer;

displaying a fingerprint image on a screen of the computer in a presentation environment of said image distortion software program;

distorting the fingerprint image so as to correct a fault detected on said fingerprint image.

The fault is for example a fault in taking the print, a local deformation of the print due to uneven pressure of the finger on the surface from which the print is taken owing to the elasticity of the skin or the nature of the support.

By using this method, a specialist can fix on the fingerprint image, the result of his analysis of each fault with the taking of the fingerprint in order to eliminate the faults that he detects from the image. The specialist can then analyze the characteristic points of the fingerprint image without needing continuous effort to take mental account of the faults of the image.

A second subject of the invention is a computer system comprising a man/machine interface and a processing unit, characterized in that it comprises:

means of access to one or more files containing at least one fingerprint image;

an image distortion software program for displaying a fingerprint image on the man/machine interface and for distorting the fingerprint image by means of the man/machine interface.

By means of this computer system, the specialist can use the method which is the subject of the invention.

Further details and advantages of the invention will emerge from an example of use, described with reference to the appended drawings in which:

DETAILED DESCRIPTION OF THE INVENTION

Figure 1:
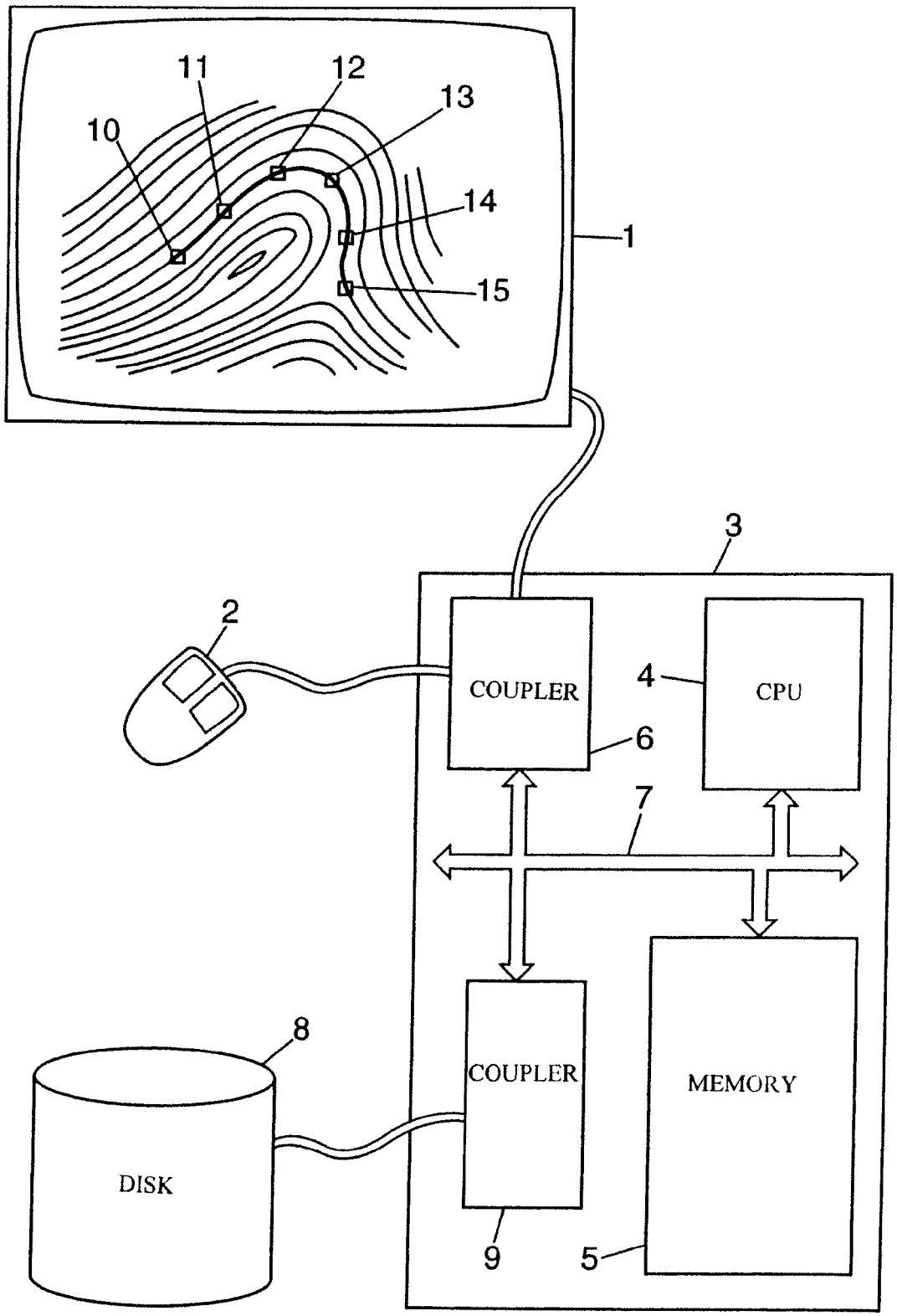
FIG. 1 diagrammatically shows a computer system in accordance with the invention.

With reference to FIG. 1, a computer system comprises a man/machine interface with a screen 1 and a mouse 2. A computer 3 comprises a processing unit 4 such as a microprocessor, a memory 5 and a bus 7 to which the processing unit 4 and the memory 5 are linked in a known manner. A disk 8 comprises one or more files containing at least one fingerprint image digitally coded point by point, for example in the *.bmp format known from office computing.

The memory 5 contains an image distortion software program executable by the processing unit 4. A coupler 9, linked on the one hand to the disk 8 and on the other hand to the bus 7, allows the processing unit 4 to access the image files of the disk 8 so as to load at least one thereof into memory 5. A coupler 6, linked on the one hand to the screen 1 and to the mouse 2 and on the other hand to the bus 7, allows the processing unit 4 to display on the screen 1 a fingerprint image in an environment of the image distortion software program.

The image distortion software program contained in the memory 5 is devised so as to dispose by means of the mouse 2, anchoring points 10, 11, 12, 13, 14, 15 on the fingerprint image displayed on the screen 1. The software catalogs in memory the planar coordinates of each anchoring point disposed by means of the mouse.

Moreover, for each pair of planar coordinates defining an image point, the image distortion software program utilizes values of attributes such as levels on a grayscale so as to represent the dark lines and the light lines of the fingerprint on the screen 1.

The image distortion software program is devised so as to move an anchoring point 12 by means of the mouse 2, while leaving the other anchoring, points 10, 11, 13, 14, 15 fixed and to do this operation by permuting any anchoring point disposed on the fingerprint image.

The image distortion software program is devised to recalculate the coordinates of each image point subsequent to a movement of an anchoring point, so as to model a planar plastic distortion of the image.

The modeling is for example programmed in such a way that the coordinates of a point labeled by its attribute values, are recalculated so as to comply with the mechanical rules of distortion of media. That is to say each point of the image is moved in a manner analogous to a point of a plastic surface subjected to compressive and elongational loads with respect to the anchoring points that have remained fixed according to the initial position that this point of the image occupies with respect to the moved anchoring point and according to the sense and the direction of movement of the moved anchoring point. Thus, considering for example, a movement of a first anchoring point that shifts the first anchoring point closer to a second, anchoring point that has remained fixed while shifting the first anchoring point further away from a third anchoring point that has remained fixed, it is possible to observe a reduction in spacing between the lines situated between the first anchoring point and the second anchoring point and an increase in spacing between the lines situated between the first anchoring point and the third anchoring point.

Figure 2:
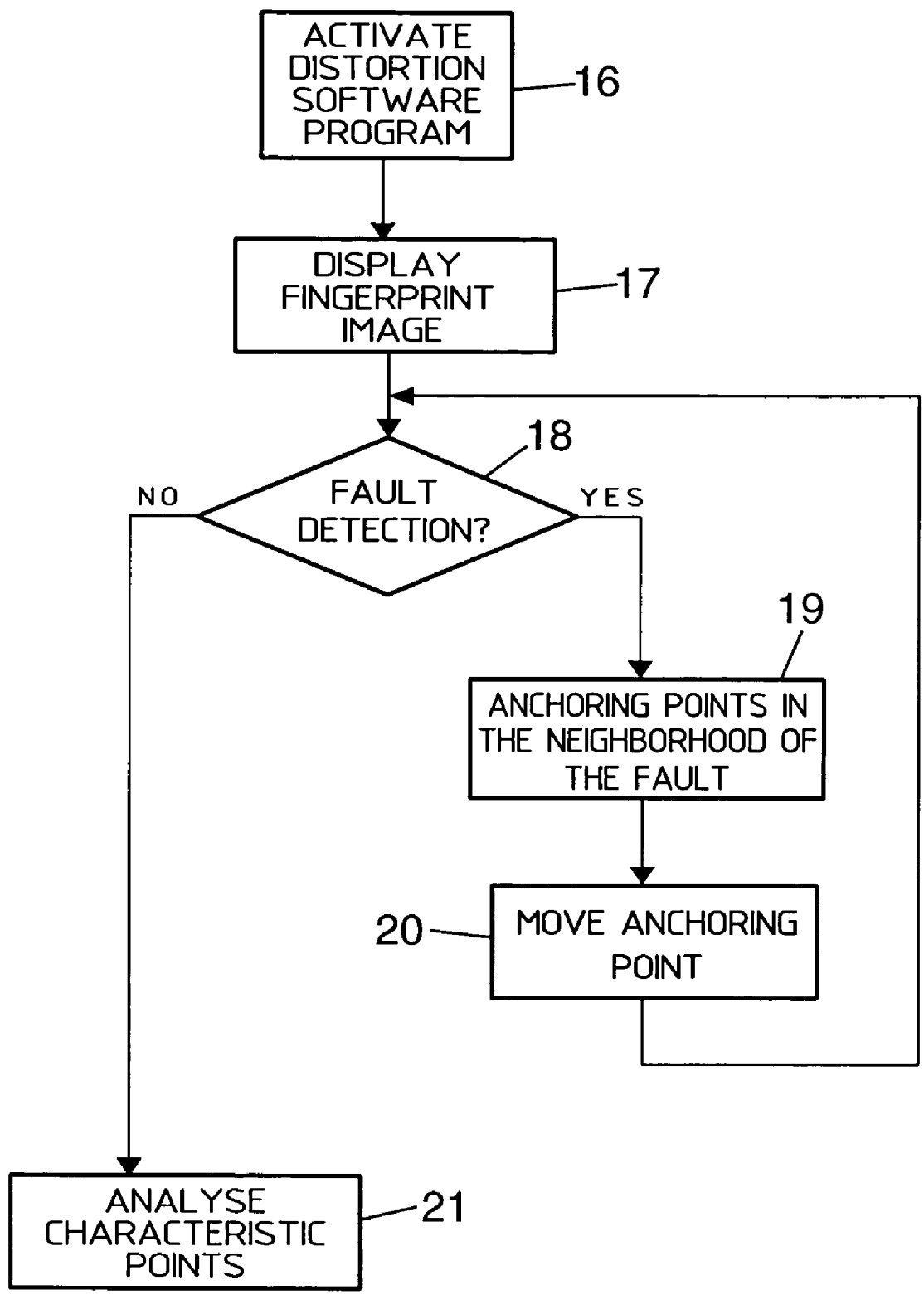
FIG. 2 shows method steps in accordance with the invention.

With reference to FIG. 2, a fingerprint recognition method in accordance with the invention comprises a step 16 in which the image distortion software program is activated so as to display on the screen 1 a usage environment of the image distortion software program.

In a step 17, a fingerprint image is displayed on the screen 1, within the environment of the image distortion software program.

In a step 18, the fingerprint image is observed so as to detect any faults with the taking of the print as may be done by a specialist with his own innate know-how.

If no fault is detected, the characteristic points of the fingerprint image are analyzed in a step 21 so as to continue a customary method of fingerprint image recognition.

If a fault is detected, anchoring points are placed on and or in the neighborhood of the fault in a step 19. To do this, the cursor of the mouse is brought to the screen over the point of the image where one wishes to place an anchoring point and one clicks, for example, on the left button of the mouse. After having placed the last anchoring point, one clicks for example on the right button of the house.

In a step 20, one or more anchoring points are moved in such a way as to correct the fault detected. To do this, the cursor of the mouse is brought onto the anchoring point to be moved. One presses for example on the left button of the mouse and without releasing the pressure, one moves the cursor to the new desired position of the anchoring point. One then releases the button of the mouse, thereby causing a recalculation of the coordinates of the points of the image by the image distortion software program.

Steps 18 to 20 are repeated until there is no longer any detection of fault in step 18.

Figure 3:
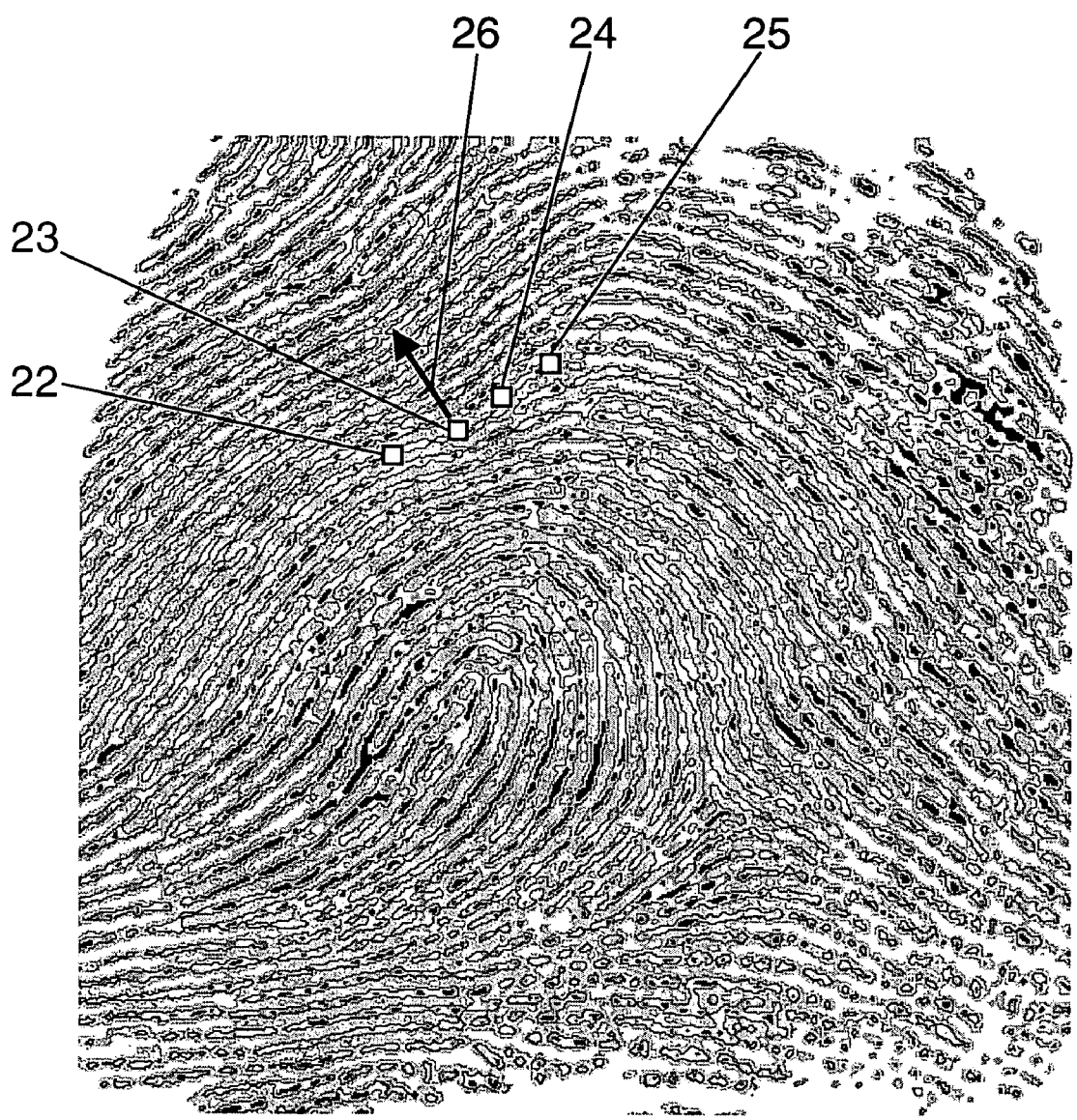
FIG. 3 shows a deformed image of a fingerprint.

FIG. 3 shows a deformed fingerprint image on which a specialist has placed four anchoring points 22, 23, 24, 25 since he has detected a fault in the neighborhood of the anchoring points 23 and 24.

Figure 4:
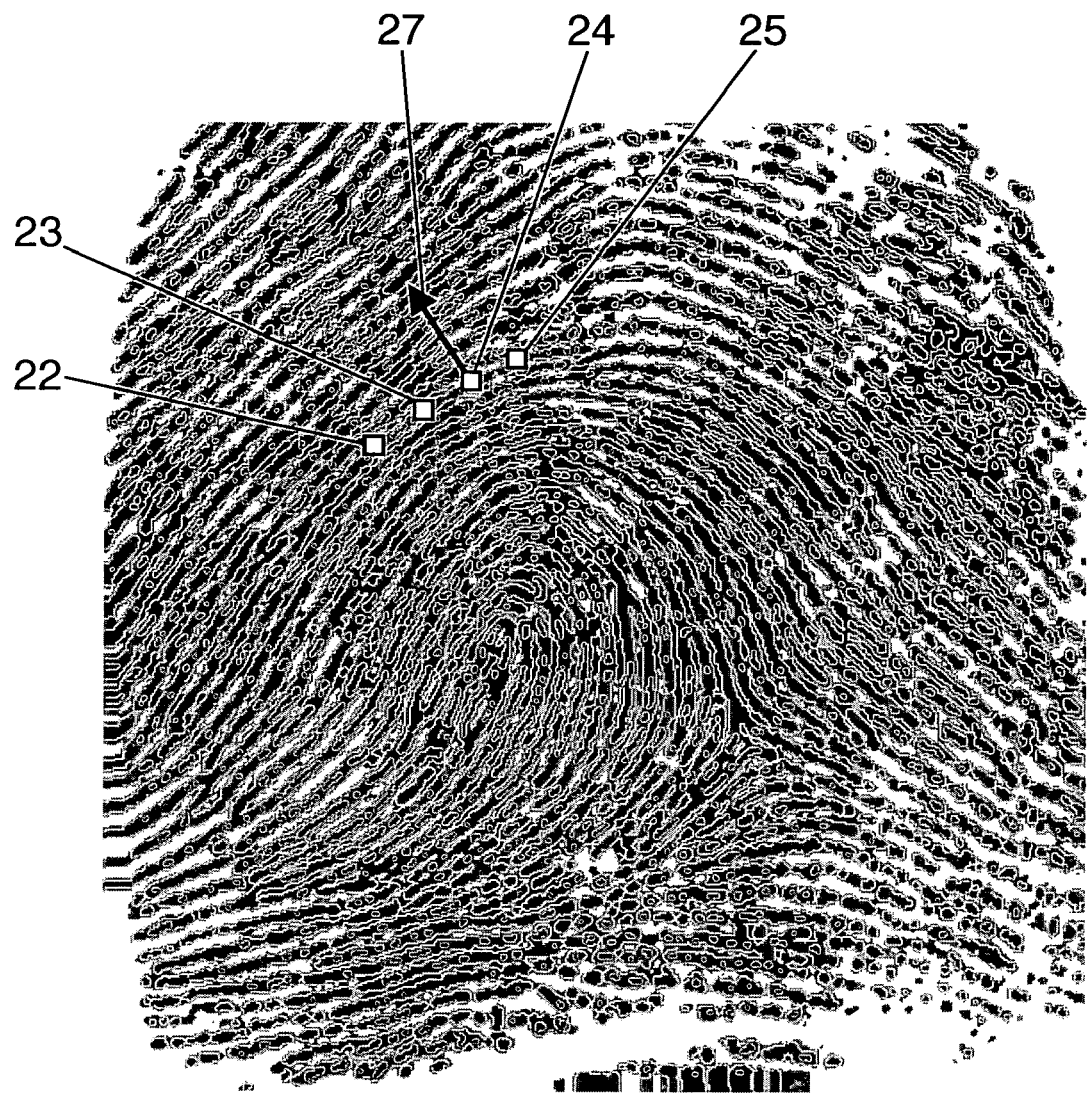
FIG. 4 shows a corrected image of a fingerprint obtained after distortion of the image of FIG. 3.

FIG. 4 shows the fingerprint image after the specialist has moved the anchoring point 23 in the sense and the direction of the arrow 26 presented in FIG. 3 and the anchoring point 24 in the sense and the direction of the arrow 27, the anchoring points 22 and 25 remaining fixed. The fault detected in the image of FIG. 3 has disappeared in the image of FIG. 4.

It is observed that the lines of the image of the fingerprint have hardly varied outside the neighborhood of the fault and that the characteristic points are preserved so as to allow analysis thereof. The specialist can concentrate his attention on the corrected image of FIG. 4 without having to worry about the fault which has then disappeared.

Moreover, the coordinates of the characteristic points in the plane of the image, which are then determined with greater accuracy, facilitate the comparison with characteristic points on known fingerprint images cataloged in databases.

The invention claimed is:

1. A method of fingerprint recognition comprising:
   activating an image distortion software program on a computer;
   displaying a fingerprint image on a screen of the computer in a presentation environment of said image distortion software program;
   disposing anchoring points in a neighborhood of a fault detected in a subpart of said fingerprint image;
   moving one of the anchoring points while leaving the other anchoring points fixed;
   distorting the fingerprint image so as to correct the detected fault, by taking account of said one of the anchoring points moved and of the other anchoring points left fixed.

2. The method of fingerprint recognition as claimed in claim 1, wherein each one of the anchoring points is disposed at any position in said subpart of the fingerprint image selected by a user of the computer.

3. An image distortion software program stored on a computer readable medium, comprising code instructions for, with respect to a fingerprint image displayed on a screen of the computer in a presentation environment of said image distortion software program:
   disposing anchoring points in a neighborhood of a fault detected in a subpart of said fingerprint image;
   moving one of the anchoring points while leaving the other anchoring points fixed;
   distorting the fingerprint image so as to correct the detected fault, by taking account of said one of the anchoring points moved and of the other anchoring points left fixed.

4. The image distortion software program as claimed in claim 3, wherein disposing anchoring points in a neighborhood of a fault detected on said fingerprint image is performed in response to a user of the computer selecting any respective positions in said subpart of the fingerprint image.

5. A computer system comprising a man/machine interface and a processing unit for analyzing a fingerprint image, comprising:
- means of access to one or more files containing at least one fingerprint image;
- an image distortion software program comprising code instructions for, with respect to a fingerprint image displayed on the man/machine interface:
  - disposing anchoring points in a neighborhood of a fault detected in a subpart of said fingerprint image;
  - moving one of the anchoring points while leaving the other anchoring points fixed;
  - distorting the fingerprint image so as to correct the detected fault, by taking account of said one of the anchoring points moved and of the other anchoring points left fixed.

6. The computer system as claimed in claim 5, wherein disposing anchoring points in a neighborhood of a fault detected on said fingerprint image is performed in response to a user of the computer selecting any respective positions in said subpart of the fingerprint image by means of the man/machine interface.

7. The method of fingerprint recognition as claimed in claim 1, wherein the step of distorting the fingerprint image so as to correct the detected fault includes distorting at least part of the fingerprint image which is not limited to said subpart of the fingerprint image.

8. The image distortion software program as claimed in claim 3, wherein distorting the fingerprint image so as to correct the detected fault includes distorting at least part of the fingerprint image which is not limited to said subpart of the fingerprint image.

9. The computer system as claimed in claim 5, wherein distorting the fingerprint image so as to correct the detected fault includes distorting at least part of the fingerprint image which is not limited to said subpart of the fingerprint image.

\* \* \* \* \*